United States Patent [19]
Jaffe et al.

[11] Patent Number: 5,781,461
[45] Date of Patent: Jul. 14, 1998

[54] DIGITAL SIGNAL PROCESSING SYSTEM AND METHOD FOR GENERATING MUSICAL LEGATO USING MULTITAP DELAY LINE WITH CROSSFADER

[75] Inventors: David A. Jaffe, Berkeley; Julius O. Smith, III, Palo Alto, both of Calif.

[73] Assignee: Board of Trustees of the Leland Stanford Junior University, Palo Alto, Calif.

[21] Appl. No.: 697,955

[22] Filed: Sep. 4, 1996

Related U.S. Application Data

[63] Continuation-in-part of Ser. No. 647,296, May 9, 1996.
[51] Int. Cl.$^6$ .................................................. G06F 17/10
[52] U.S. Cl. ............................................ 364/724.012
[58] Field of Search ........................... 364/724.01, 724.1, 364/724.16, 724.012; 84/622; 395/2.74

[56] References Cited

U.S. PATENT DOCUMENTS

| | | |
|---|---|---|
| 4,369,336 | 1/1983 | Agnello . |
| 4,464,784 | 8/1984 | Agnello . |
| 4,726,067 | 2/1988 | Alonso ................................ 381/106 |
| 5,432,296 | 7/1995 | Takeuchi et al. . |
| 5,500,486 | 3/1996 | Smith, III ............................. 84/622 |
| 5,583,309 | 12/1996 | Fujita ................................... 84/622 |

*Primary Examiner*—Tan V. Mai
*Attorney, Agent, or Firm*—Gary S. Williams; Flehr Hohbach Test Albritton & Herbert LLP

[57] ABSTRACT

A sampled data, delay line structure that includes a sampled data delay line, two readers for reading data at corresponding positions of the delay line, controller that controls when the read position of each reader is updated for a new note of a different pitch, and a crossfader that crossfades between the outputs of the two readers to produce a legato transition between the two discrete notes associated with the two readers. The controller receives a control signal indicating a sequence of note events to be implemented by the delay line structure. When a new note on event occurs while a previous note is still playing, a legato crossfade sequence is performed. In particular, the delay line reader not used by the previous note is set to a delay position associated with the new note, and the crossfader is enabled. The crossfader gradually transitions its output from that of the reader used for the previous note to the output of the reader used from the new note. Each reader may include an interpolation filter, such as an allpass filter, so that the delay line length associated with each note can be a non-integer value. The crossfade ramp used by the crossfader is preferably an "s-shaped" non-linear function.

18 Claims, 5 Drawing Sheets

$out(n) = U_R(n-1) + AP\_COEF \times (U_R(n) - out(n-1))$

DIGITAL SIGNAL PROCESSING SYSTEM AND METHOD FOR GENERATING MUSICAL LEGATO USING MULTITAP DELAY LINE WITH CROSSFADER

This application is a continuation-in-part of application Ser. No. 08/647,296, filed May 9, 1996.

The present invention relates generally to digital signal processing for generating music and other digitally sampled signals, and particularly to the use of filtered delay loops in digital signal processing systems and methods to produce high quality musical legato sounds.

BACKGROUND OF THE INVENTION

The development of high quality Digital Waveguide, Karplus-Strong, and Commuted Synthesis musical instrument synthesis techniques requires the use of delay lines in a feedback loop arrangement, sometimes called filtered delay loops (FDL). Filtered delay loops are also sometimes called delay line resonators. These techniques allow state information to be carried over from note to note. This is essential for realistic simulation of musical instruments.

For example, plucking a string that is already sounding adds energy to the existing energy in a string. Simulation of such a string requires carrying over state information from one note event to the next.

A particularly-important case of state information carry over is that of the musical technique called "legato". Legato in a wind instrument is executed by changing the player's fingering on the instrument without interrupting the flow of air. As a result, the resonant chamber in the instrument smoothly transitions from one standing wave mode to another. Legato in a bowed string instrument is executed by changing the left hand finger positions without stopping the bow or changing the bow direction. Legato in a plucked instrument is executed by "hammering on" or "pulling off" a finger from a sounding string. To realistically simulate legato in such musical instruments, it is important to be able to change the length of the FDL that represents the air column, string or other resonator structure in a seamless manner, without interrupting the driving function.

The prior art provides three primary methods for providing a transition between notes being generated using a FDL: (1) simply and abruptly changing the delay line length from the length associated with a first note to the length associated with a second note, and (2) smoothly varying the delay line length (e.g., using either a linear interpolation filter or an allpass interpolation filter). Neither of these approaches provides a legato transition between successive notes.

The naive approach, abruptly changing the length of the FDL to simulate a transition from one note to another, is not usable because it introduces a discontinuity in the waveform being generated. This causes an audible "click," which then resonates through the simulators digital filter network (including the FDL), giving the impression of a "spurious pluck" in the case of plucked string synthesis.

The primary problem with smoothly varying the delay line length is that this produces a glissando effect (also known as a portamento effect) instead of a legato transition between two discrete notes. A secondary problem with smoothly varying the delay line length is that the prior art approaches for smoothly varying the delay line length tend to cause undesirable secondary effects such as audible clicks or low pass frequency filtering.

In the field of computer music, delay lines have been used for many years in digital effects filters to generate reverberation, chorus and flanging effects. The most general case in the prior art is the tapped delay line in which a signal is fed into a delay line and multiple taps are used to extract the signal at various delays. For both chorus and flanging (in digital implementations), the delay taps must be interpolated to avoid clicking noise. Linear interpolation (with a linear or finite impulse response (FIR) filter) is typically used for this purpose.

Since the introduction of digital waveguide synthesis techniques, delay lines in a feedback loop arrangement have also been used for sound synthesis as well as audio effects. In these methods, the delay line length corresponds to the pitch-period length. The delay line length must be interpolated to give accurate tuning at high pitches or low sampling rates. The length of the delay line must be changed in order to change the pitch. In early waveguide synthesis methods, the delay line length was changed by simple methods that did not protect against artifacts in the sound being generated. The present invention provides a method for reducing these artifacts to sub-audibility.

Delay lines have been implemented by two main methods: shift registers and circular buffers. Shift registers are feasible only in special purpose hardware and are therefore extremely rare today. Circular buffers are much more typically used in computer music synthesizers, and are generally implemented in software using one or more pointers and a table in memory. Referring to FIG. 1, in delay line implementations 50 using a single read and write pointer, at each sampling time the pointer is used to address the delay line memory 52 to read out the "oldest" value $U_R(n)$ in the table. Then the signal input sample in(n) for the current sample time is written into the table (i.e., memory array 52) at the same location that the oldest value was read from. Then the pointer is incremented and compared to the address of the last table entry. If the incremented pointer position is greater than the last table entry, the pointer is "wrapped around" to the beginning of the table (i.e., the table length in words is subtracted from the pointer to generate a revised pointer value). Often the signal values read from the table are filtered (as represented by filter 54) to provide an interpolated delay and the resulting filtered signal out(n) may be fead back and combined with the input signal in(n) to form a generate a delay line memory input signal in2(n) for storage in the delay line memory 52. The resulting structure is often called a delay line resonator.

Referring to FIG. 2, a delay line 70 can also be implemented using a fixed length memory structure 71 whose length corresponds to the minimum supported pitch, and separate read and write pointers. The read and write pointer positions are incremented each sample period and are wrapped around to the beginning of the delay line memory structure 71 whenever they reach its end. When generating a single note of unchanging pitch in a delay line resonator, the read pointer follows a fixed delay (i.e., a fixed number of sample positions) behind the write pointer. The write pointer does not have to be interpolated, while the read pointer does for accurate tuning. That is, to generate notes that do not correspond to a delay line whose length is equal to an integer number of sample periods, an interpolation filter 72 is used to produce a delay line whose effective length may include a fractional number of sample periods.

The sampled data delay line 71 stores one data value for each sampling period. For instance, if the system in which the delay line 70 is used has a sampling rate $f_s$ of 44,100 Hz, then a new data sample is inserted into the delay line 44,100 times per second at the position specified by a write pointer. If data is simply read from the delay line at specified reader position R with no interpolation filter, producing an output signal denoted as $U_R(n)$, then the delay line is said to be an integer length delay line, because the output signal $U_R(n)$ is delayed by an integer number of sampling periods from the time it was input into the delay line.

At least two types of interpolation are well known for producing a delay line of fractional length: linear interpolation filters (or more generally FIR interpolation filters) and allpass filters. A linear interpolation filter can be used to produce a delay line having a fractional length of L+a0, where L is an integer and a0 is a fractional value between 0 and 1. L is the distance, in units of data sample positions, between the current input position W to the delay line and the filter's reader position, R-1, during the prior sample period:

$$L=(W-(R-1)) \text{ modulo } DLB$$

where W is the write pointer position, R is the read pointer position, and DLB is the length of the delay line memory structure.

During each time period, n, the interpolation filter 72 reads a sampled data value $U_R(n)$ and outputs a filtered data value out(n) that is computed as follows:

$$\text{out}(n)=a0 \times U_R(n)+(1-a0) \times U_R(n-1).$$

For example, if a0 is set equal to 0.5, the delay line has an effective length of L+0.5, and out(n) is equal to the average of the two data samples most recently read by the filter:

$$\text{out}(n)=0.5 \times (U_R(n)+U_R(n-1)).$$

Non-integer length delay lines that use linear interpolation, or other FIR (finite impulse response filter) interpolation methods, have unsatisfactory energy losses caused by the FIR interpolation filter in high frequency (short delay length) loops. This causes high pitched musical notes to decay away too quickly. For instance, when the control coefficient a0 is set to 0.5 in the linear interpolation filter, the filter acts as a low-pass filter with a zero of transmission at half the sampling rate and also substantially attenuates frequency components of the loop signal that are close to half the sampling rate.

On the other hand, a standard allpass interpolation filter avoids the high-frequency cut-off problem, at least for the static case (i.e., where the reader position relative to the write pointer and filter coefficients remain constant). See David A. Jaffe and Julius O. Smith III, "Extensions of the Karplus-Strong Plucked-String Algorithm", Computer Music Journal 7(2): 56–69, 1983 (hereinafter "Jaffe and Smith 1983"). FIG. 3 shows allpass interpolation filter 72, also known simply as an allpass filter. As shown in FIG. 3, the allpass filter 72 includes two adders 74, 75, one multiplier 76 and two unit sample delay elements 77, 78. During each time period, n, the allpass filter 72 reads a sampled data value $U_R(n)$ and outputs a filtered data value out(n) that is computed as follows:

$$\text{out}(n)=U_R(n-1)+\text{AP\_COEF} \times (U_R(n)-\text{out}(n-1)).$$

So long as the position of the delay line read pointer for the allpass filter 72 remains unchanged relative to that of the write pointer, and the filter coefficient AP_COEF remains unchanged, this filter preserves the energy in the sampled signal at each frequency (and hence the name "allpass") and thereby avoids the high frequency filtering problem associated with FIR interpolation filters.

As indicated above, abruptly changing the length of the FDL to simulate a transition from one note to another is not usable because it introduces a discontinuity in the waveform being generated, which causes an audible "click" as well as other unacceptable artifacts. Smoothly transitioning the delay line length produces a glissando effect instead of a legato transition between discrete notes.

It is therefore a goal of the present invention to provide a new delay line structure for performing legato note transitions without producing spurious clicks or glissando effects.

Another goal of the present invention is to provide a simple, computationally efficient mechanism for simulating legato note transitions.

SUMMARY OF THE INVENTION

In summary, the present invention is a sampled data, delay line structure that includes a sampled data delay line, two readers for reading data at corresponding positions of the delay line, a crossfader that crossfades between the outputs of the two readers, plus a controller that controls when the read position of each reader is updated and when the frequency of an external oscillator input signal is updated.

The controller receives a control signal indicating a sequence of note events to be implemented by the delay line structure. When a new note on event occurs while a previous note is still playing, a legato crossfade sequence is performed. In particular, the delay line reader not used by the previous note is set to a delay position associated with the new note, and the crossfader is enabled. Over a sequence of sample periods, typically corresponding to a transition period of about 10 to 30 milliseconds, the crossfader gradually transitions its output from that of the reader used for the previous note to the output of the reader used for the new note.

Each reader may include an interpolation filter, such as an allpass filter, so that the delay line length associated with each note can be a non-integer value. When an interpolation filter is used, the controller determines both the integer position of the reader and a coefficient value for the interpolation filter so as to create a delay line whose effective length corresponds to the note to be generated. The position of the new read pointer is an integer value that corresponds to an integer portion of the specified or computed delay length for the new note to be played, and the filter coefficient corresponds to a fractional portion of the new delay length.

The crossfade ramp used by the crossfader is preferably an "s-shaped" non-linear function that initially transitions away from the old note slowly during a first portion of the transition time frame, then transitions rapidly toward the new note during a second portion of the transition time frame, and then completes the transition to the new note relatively slowly during a third and final portion of the transition time frame.

In one embodiment, such as in a system in which an external oscillator drives a delay line resonator, the oscillator frequency is changed at approximately the mid-point of the crossfade transition time frame to the frequency associated with the new note. The controller provides an event signal for this purpose.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
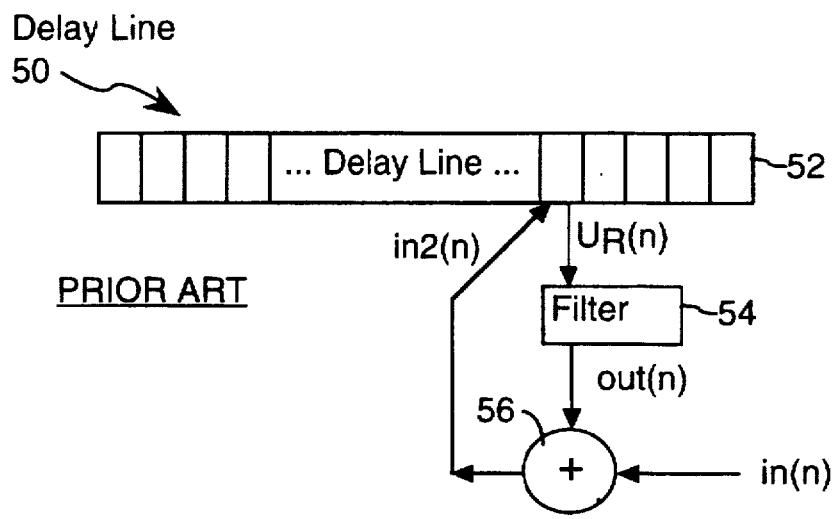
FIG. 1 is a schematic representation of a delay line resonator using a shared read/write pointer with an interpolator filter on the read pointer.
Figure 2:
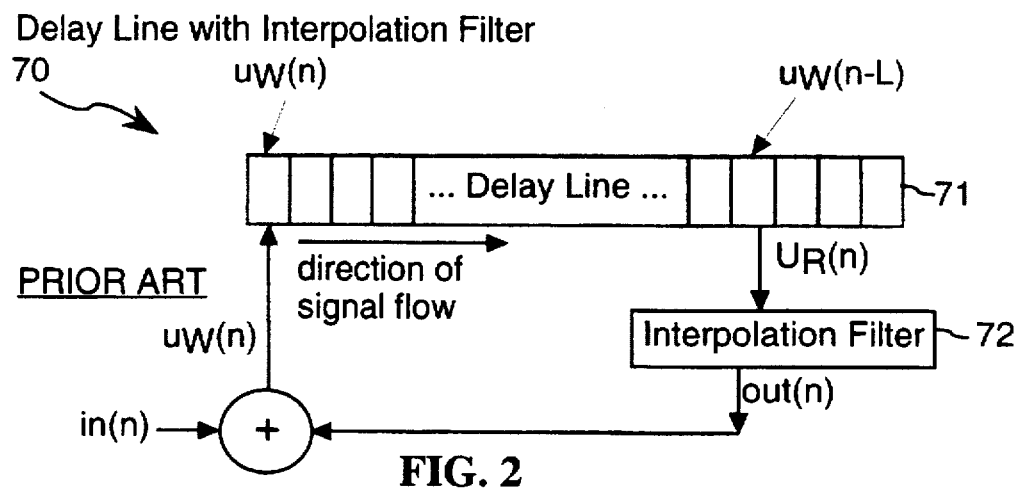
FIG. 2 is a schematic representation of a delay line resonator using separate read and write pointers with an interpolation filter on the read pointer.
Figure 3:
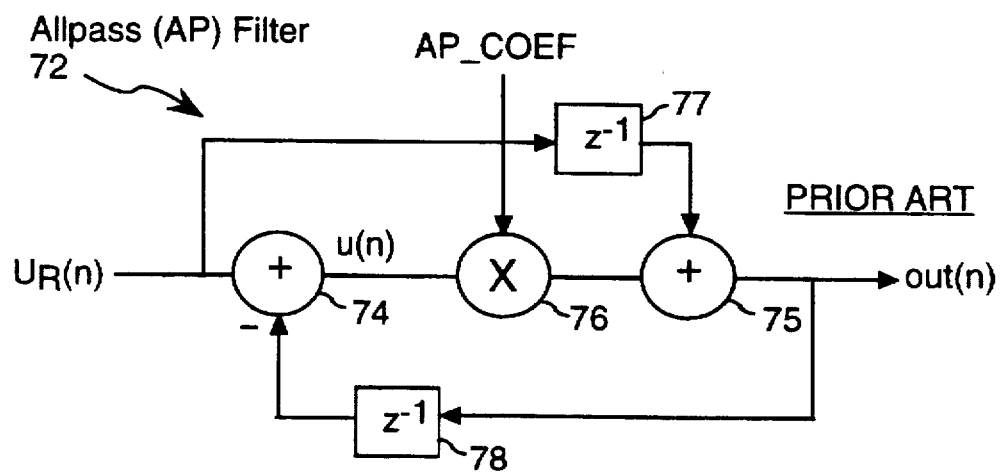
FIG. 3 is a schematic representation of an allpass filter.
Figure 4:
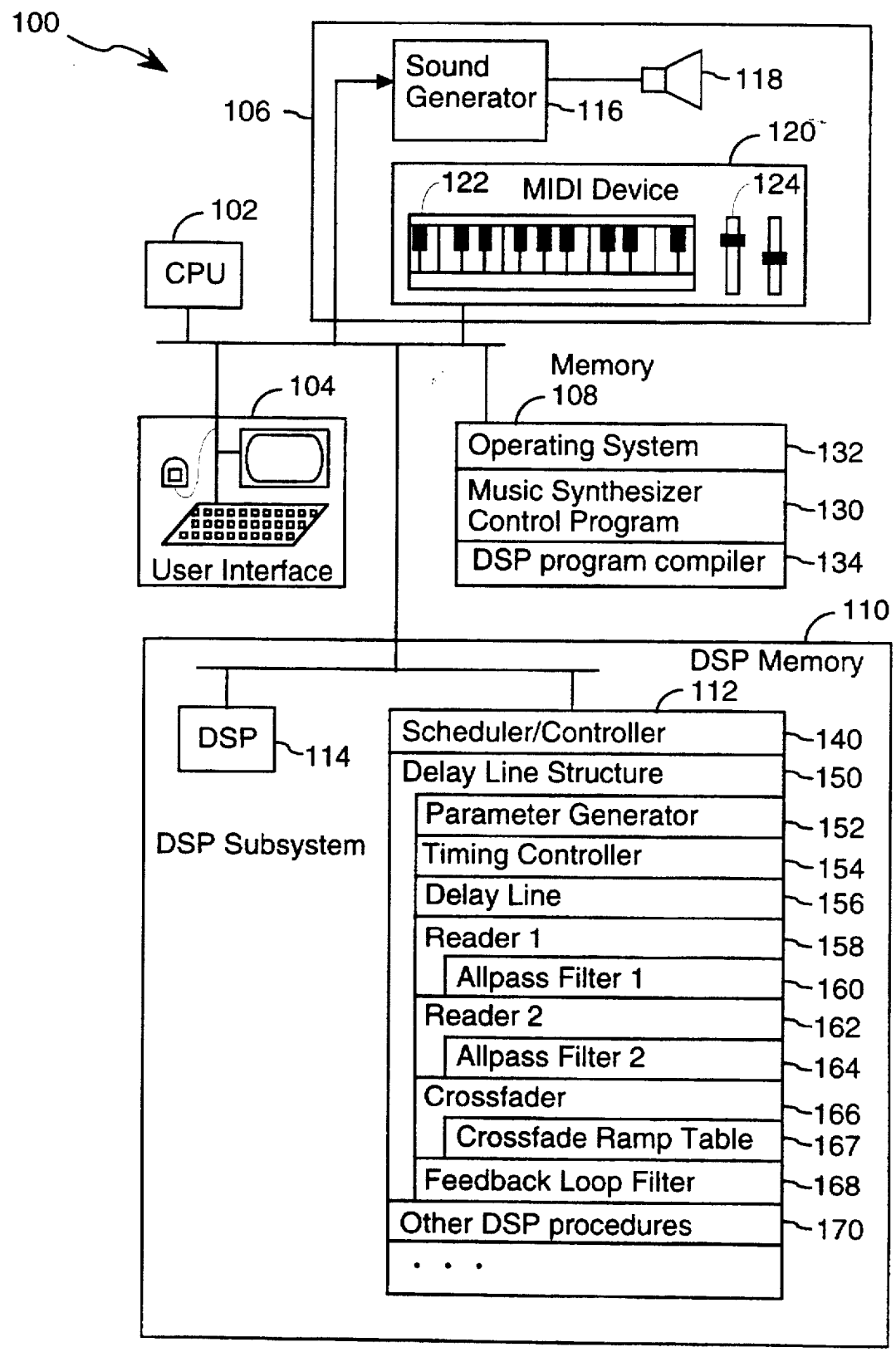
FIG. 4 is a block diagram of a computer system implementing a preferred embodiment of the present invention.

Referring to FIG. 4, there is shown a computer-based music synthesis system 100 having a host CPU 102, a computer user interface 104, a music interface 106, memory 108 (including fast random access memory and non-volatile memory such as disk storage), and a digital signal processor (DSP) subsystem 110.

The DSP subsystem 110 executes DSP programs downloaded by the host CPU 102 into the DSP subsystem's memory 112. The downloaded DSP programs typically are music synthesis programs that, when executed by the DSP subsystem's processor 114 (typically called a DSP), generate audio frequency signals. Those output signals constitute a stream of digital data values that are converted by a sound generator 116 (in the music interface 106) into analog electrical signals that are then converted into audible sound by a speaker 118. Control signals used by the DSP 114 when executing the DSP programs, can originate from a MIDI device 120, such as a device having a keyboard 122 and one or more physical controllers 124, or from a computer keyboard or pointing device in the computer user interface 104. Input signals from these input devices are typically pre-processed by the host CPU 102 through the execution of a music synthesizer control program 130 to produce a control parameter that is then passed to the DSP subsystem 110.

In addition to the music synthesizer control program 130, the host CPU's memory 108 also will typically store an operating system 132, a DSP program compiler or linker 134, as well as other software and data that are not directly relevant to the present discussion.

Figure 5:
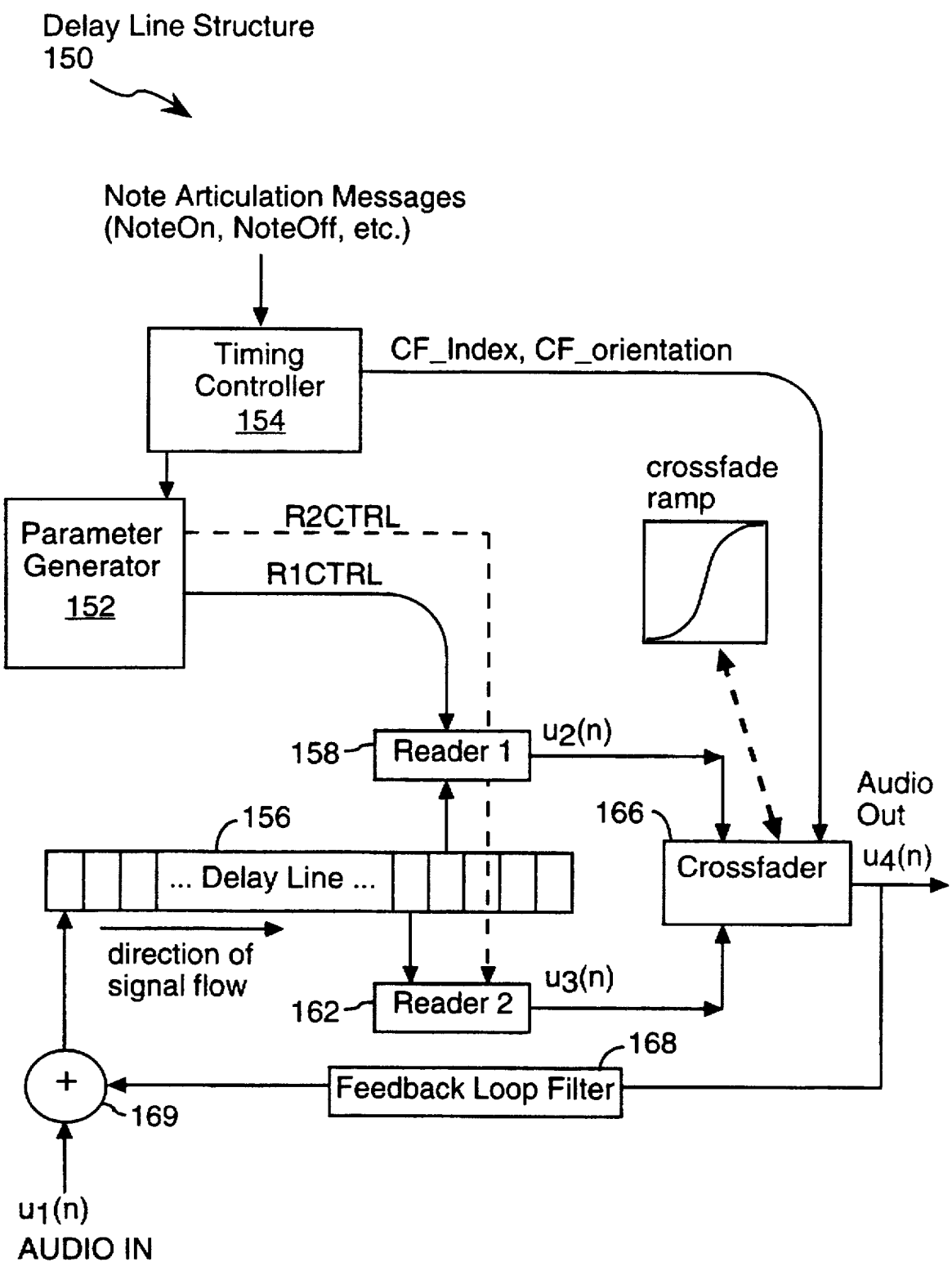
FIG. 5 is a schematic representation of a delay line with a preferred embodiment of the dual reader and crossfader arrangement of the present invention.

The memory 112 in the DSP subsystem 110 typically stores compiled DSP procedures 150, 170, and a scheduler or controller program 140 that schedules the execution of all the DSP procedures 150, 170 being executed by the DSP 114. The only one of those DSP procedures that is directly relevant to the present invention is the delay line procedure 150, which is schematically represented in FIG. 5.

While for ease of explanation the delay line structure 150 will be discussed as though it were a physical electronic circuit, it is in fact generally implemented as a DSP program or procedure. Actual music synthesis systems using the present invention will typically use delay line structures 150 wherever changeable delay lines of integer or non-integer length are needed, and thus such systems will often have a plurality of delay line structures.

Figure 6A:
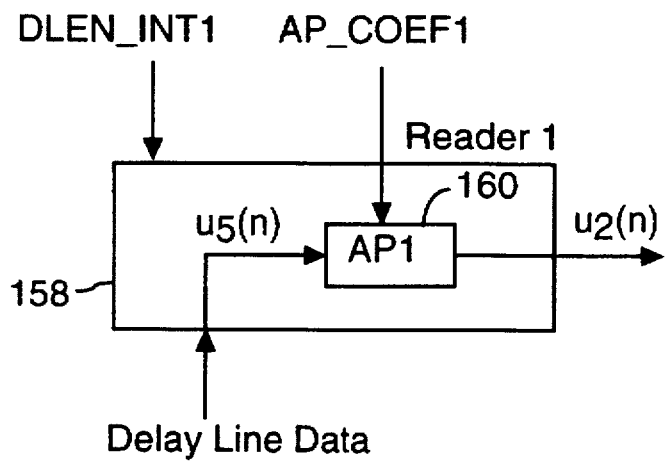
FIGS. 6A and 6B are schematic representations of the two delay line readers used in the delay line structure of FIG. 5.
Figure 6B:
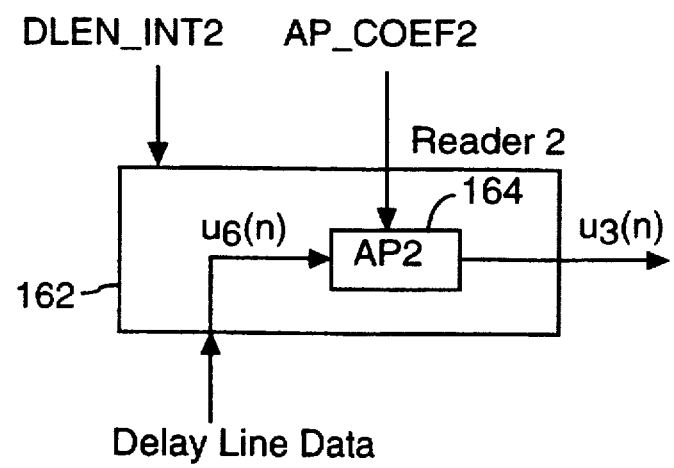

The delay line structure 150 includes a parameter generator 152, a timing controller 154, a delay line 156, first and second delay line readers 158, 162, a crossfader 166 and a feedback loop filter 168. As shown in FIGS. 6A and 6B, in a preferred embodiment the two delay line readers 158, 162 each include a respective allpass filter 160, 164. The parameter generator 152 and timing controller 154 may be considered to compose the delay line structure's controller.

The readers 158, 162 can be virtually any device for generating a steady or time varying note from data read from the delay line structure 156. While in the preferred embodiment shown in FIGS. 6A and 6B the readers are simply a read pointer plus an interpolation filter, in other implementations the readers could be much more complex. For instance, each reader 158, 162 could include circuitry for generating a note signal with vibrato, chorus, flange or other special effects. Thus the "discrete note" generated by each reader (in conjunction with the delay line 156) may have a time varying frequency, but the amplitude of the frequency variation in a discrete note produced by either reader will typically be much smaller than the frequency difference between any two discrete notes for which a legato transition might be performed.

The delay line's AUDIO IN and AUDIO OUT signals, which are also labeled u1(n) and u4(n), respectively, are the input and output audio signal to and from the delay line structure 150. These signals are updated at the audio sampling rate, for example 44,100 Hz or 22,050 Hz. In the preferred embodiment the audio sampling rate is 44,100 Hz.

The signals marked u2(n), u3(n), u5(n) and u6(n) are internal signals; n is the audio sampling index. Thus, u2(n) represents the value of signal u2 at time sample period n, while u2(n−1) represents the value of signal u2 at time sample period n−1. Any function of n may be called an "audio signal" or a "signal."

The note articulation messages received from the host computer may already be in the form of a delay line length, or may be in the form of a frequency value. In either case, the parameter generator 152 outputs control signals R1CTRL and R2CTRL to the two delay line readers. In the preferred embodiment, the R1CTRL and R2CTRL signals are each represented by a pair of values, including an integer value and an interpolation filter coefficient.

Except during note transitions, only one reader is used at a time. The crossfade control orientation signal, CF_Orientation, and the crossfade index signal, CF_Index, together determine which reader is currently being used. Depending on the orientation signal value, an index value of 0 indicates that a first one of the readers (158 or 162) is in use, and an index value of trans indicating that the other reader (162 or 158) is in use. In a preferred embodiment, in a system using a sampling rate of 44,100 samples per second, trans is equal to a value between 441 (for 10 millisecond transitions) to 1323 (for 30 millisecond transitions). A crossfade transition period of about 10 to 30 milliseconds is preferred, and more generally the crossfade transition period should be between 5 and 50 milliseconds.

Selecting large values for trans, for transition times much greater than 30 milliseconds, produces the effect of inharmonicity, as if the waveguide instrument were being driven at a frequency different from its natural resonating frequency. Small values for trans, such as those for transition times much smaller than 10 milliseconds, are so abrupt as to have the effect of a "bump" sound. The rapid crossfade is very close to a discontinuity and has the effect of injecting energy into the waveguide instrument at high frequencies.

For the purposes of explaining the operation of the preferred embodiment of the present invention, we will assume that the host CPU 102 receives a pitch signal $f_{BW}$ from the MIDI keyboard 122 and generates a "delay length" value DLEN that is equal to the DSP subsystem's data sampling rate (typically 44,100 Hz) divided by the pitch signal:

$$\text{DLEN} = \text{sampling rate/pitch}$$
$$= 44{,}100/f_{BW}$$

For instance, if $f_{BW}$ is equal to 220 Hz, then DLEN is equal to 200.4545 samples.

The parameter generator 152 converts the delay length value DLEN received from the host CPU into an associated integer value DLEN__INT and a filter coefficient AP__COEF. As indicated, DLEN is a real number that might not be an integer. The generated DLEN__INT and AP__COEF values are then assigned and transmitted to one of the two delay line readers. In this example, DLEN__INT might be 200 or 199, depending on whether the allpass interpolator will provide 0.4545 samples or delay or 1.4545 samples of delay, respectively.

For the purposes of this document, the term "crossfade" is defined to mean combining two signals so as to smoothly transition from one signal to the other. For instance, given two signals S1 and S2, a crossfade signal CF may be defined as:

$$CF(n)=\alpha(n)\cdot S1(n)+(1-\alpha(n))\cdot S2(n)$$

where $\alpha(n)$ is the "crossfade" coefficient. As $\alpha(n)$ is smoothly transitioned in value from 0 to 1, the signal CF(n) crossfades (i.e., smoothly transitions) from a value corresponding to S2(n) to a value corresponding to S1(n).

The delay line 156, as described above with reference to FIG. 5, stores and delays a digital audio signal by an integer number of time samples. The integer number of time sample delays is determined by the read pointer positions of reader 1 and reader 2. The delay line is generally formed by the combination of sequential data memory locations and an addressing scheme constructed such that an audio signal sample may be stored in the memory and read back out at a specified number of integral time samples later. The delay line data structure is constructed in the preferred embodiment such that there may be more than one reader, and such that the delay time intervals (i.e., read pointer positions) associated with each reader may be changed arbitrarily whenever a new note event occurs. In the preferred embodiment, the delay line is implemented using a circular buffer design (i.e., an array of memory locations) with separate read and write pointers.

In the preferred embodiment, legato transitions cannot be performed more frequently than every T samples, where T is the minimum crossfading time interval allowed. For instance, when T is set to 1470, the delay line lengths associated with the two readers are updated no more frequently than every 1470 sample periods (i.e., about 1/30th of a second).

The delay line 156 in combination with reader 1 delays the AUDIO IN signal by DLEN1 time samples as follows, $$u2(n)=u1(n-DLEN1)$$

The delay line 156 in combination with reader 2 delays the AUDIO IN signal by DLEN2 time samples as follows, $$u3(n)=u1(n-DLEN2)$$

When DLEN1 or DLEN2 are not limited to integer values, the signals u2(n) and u3(n) cannot be obtained simply by reading values directly from the delay line structure. Rather, an interpolation filter is needed, as shown in FIGS. 6A and 6B. It is known that a first order allpass filter may be used to implement fractional delays.

The allpass filters shown are standard first order allpass filters, the output of which may be computed in a variety of ways that are generally known. In particular, the output u2(n) of the first reader 158 may be represented by the following difference equation:

$$u5(n)=u1(n-DLEN\_INT1)$$

$$u2(n)=AP\_COEF1\times u5(n)+u5(n-1)-AP\_COEF1\times u2(n-1)$$

The second allpass filter AP2 is also a standard first order allpass filter, the output of which may be computed in a variety of ways that are generally known, in particular by the following difference equation, $$u6=u1(n-DLEN\_INT2)$$

$$u3(n)=AP\_COEF2\times u6(n)+u6(n-1)-AP\_COEF2\times u3(n-1)$$

The parameter generator 152 takes a positive non-integer delay line length input value, DLEN, and converts it to a integer part, DLEN__INT, and a fractional part, DLEN__FRAC, which may be greater than 1.0. DLEN__INT is used to set the length of an integer length delay line, while DLEN__FRAC is converted to the appropriate allpass filter coefficient, AP__COEF, to implement the fractional delay portion as a first order allpass filter. The integer delay line and the first order allpass filter cascaded together then implement the non-integer delay line length, DLEN__INT1 or DLEN__INT2.

A variety of methods may be used to generate the exact or approximated allpass filter coefficient for a desired fractional delay length. Jaffe and Smith (1983) note that $$AP\_COEF=(1-DLEN\_FRAC)/(1+DLEN\_FRAC)$$

makes a very good approximation the desired allpass filter coefficient to implement a fraction delay of DLEN__FRAC time samples. Since a divide operation is required in the above computation, and since divide operations are generally difficult to perform on DSP's, in the preferred embodiment an alternative polynomial series approximation, derived from a Taylor Series expansion around the point, DLEN__FRAC=1.0, is used:

$$AP\_COEF=-0.5\times(DLEN\_FRAC-1)+0.25\times(DLEN\_FRAC-1)^2-0.125\times(DLEN\_FRAC-1)^3\ldots$$

This polynomial formulation is most accurate when DLEN__FRAC is near 1.0. Therefore, in the preferred embodiment DLEN__INT and DLEN__FRAC are computed from DLEN as follows:

First, set DLEN__INT equal to the integer part of DLEN:

$$DLEN\_INT=\lfloor DLEN\rfloor$$

Second set DLEN__FRAC equal to the fractional part of DLEN, which may be computed by subtracting DLEN__INT from DLEN:

$$DLEN\_FRAC=DLEN-DLEN\_INT$$

Finally, if DLEN__FRAC is less than MINIMUM__DLEN__FRAC, which we will define below, then add 1.0 to DLEN__FRAC and subtract 1 from DLEN__INT:

If DLEN_FRAC < MINIMUM_DLEN_FRAC
{
   DLEN_FRAC = DLEN_FRAC + 1
   DLEN_INT = DLEN_INT - 1
}

In this way we obtain DLEN_INT, an integer; DLEN_FRAC, a fractional value lying between MINIMUM_DLEN_FRAC and 1.0+MINIMUM_DLEN_FRAC; where DLEN_INT plus DLEN_FRAC is equal to DLEN.

If we chose MINIMUM_DLEN_FRAC=0.618, this constrains DLEN_FRAC to lie between 0.618 and 1.618, which in turn constrains AP_COEF to lie between −0.236 and +0.236, approximately. This keeps the allpass filter coefficient as close to 0 as possible, which in turn, minimizes the transient effects of making a discrete change in the filter coefficient while the filter is running. The inventors of the present invention have found that when the allpass filter coefficient is constrained to lie between −0.236 and +0.236, the undesirable transient effects drop more than 72 dB in only 5 time samples after a discrete coefficient change. Transient effects can continue for a much longer time if the filter coefficient is allowed to get near 1.0 or −1.0. Keeping the transient time of the filter short is desirable in order to design an effective crossfader.

The crossfader 166 computes its output value from its two input values, u2 and u3, by smoothly transitioning from one to the other over a period of time. The process of smoothly transitioning from one signal to another is called "crossfading." Trans is the number of samples over which a crossfade between u2 and u3 signals is performed. As indicated above, in the preferred embodiment trans is chosen so that the cross fade time is between approximately 10 and 30 milliseconds.

The crossfader 166 uses a crossfade ramp function or table to generate crossfade coefficients that range between 0 and 1 as a time sample index CF_Index ranges in value from 0 to trans. During a transition, the timing generator outputs index values CF_Index that increment from 0 to trans over trans sample periods, and the crossfade function or a table lookup procedure outputs corresponding crossfade coefficients for each sample period.

The crossfade table from which the crossfade ramp is read preferably stores an "s-shaped" non-linear ramp function (schematically shown in FIG. 5) that initially transitions away from a value of 0 (i.e., away from the old note) slowly during a first portion of the transition time frame, then transitions rapidly toward a value of 1 (i.e., toward the new note) during a second portion of the transition time frame, and then completes the transition to a value of 1 (i.e., to the new note) relatively slowly during a third and final portion of the transition time frame.

The crossfader computes its output value from its two input values, u2 and u4, according to the following difference equation:

for n−T0<trans:

$$u4(n)=CF\_Table(n-T0) \times u_{NEW}(n)+[1-CF\_Table(n-T0)] \times u_{OLD}(n)$$

for n−T0≥trans:

$$u4(n)=u_{NEW}(n)$$

where T0 is the time that the crossfade begins, $u_{NEW}(n)$ is defined as u2 or u3, depending on which reader is being used to generate the new note, and $u_{OLD}(n)$ is defined as the other one of u2 or u3 not represented by $u_{NEW}(n)$ and represents the output of the reader used to generate the previous note. The crossfade orientation signal, CF_Orientation, dictates which of the u2 and u3 signal is defined as $u_{NEW}$ and which is defined as $u_{OLD}$.

"n−T0" is the number of time samples since the crossfade began, and CF_Table reads out sequential values from the crossfade ramp table or generating function starting from the first value in the table whenever a crossfade orientation change is made. In this way, whenever the crossfade orientation is changed, the crossfader 166 crossfades from $u_{OLD}(n)$ to $u_{NEW}(n)$ over the course of trans samples. Once the crossfade ramp function or table reaches its final value (1, in the preferred embodiment), it continues to output that same value until the crossfader 166 receives a change in the crossfade orientation signal CF_Orientation, at which time T0 is reset to the current time index and the crossfade ramp function or table begins again at its starting value.

The Timing Controller 154 initiates a crossfade when it receives a note articulation message associated with a legato transition from one note to another. It directs the parameter generator to generate new delay length parameters (DLEN_INT and AP_COEF) for the reader 158 or 162 to be used to generate the new note and synchronizes these parameter updates with the crossfade orientation of the crossfader 166.

An important special case that must be handled by the timing controller 154 is the generation of a first note of a legato phrase. For the first note of a legato phrase, a crossfade must not be generated. In this case, whichever reader is currently the "new reader" is assigned new delay length parameters (DLEN_INT and AP_COEFF) corresponding to the new note's fundamental frequency. No click artifact is generated because it is assumed that the delay line will be re-initialized with this note. In this special case, the crossfade orientation of the crossfader 166 is not changed.

When a legato transition is desired, the parameter generator computes the new values of the delay length parameters, DLEN_INT and AP_COEFF, corresponding to the fundamental frequency of the new note, and sends it to the appropriate reader. If Reader1 was updated the last time an update was made (i.e., the last time a new note was synthesized), then Reader2 will be updated this time, and vice versa.

When Reader1 is "updated," that means that the current value of DLEN is read or computed by the parameter generator 152, which then updates the values of DLEN_INT and AP_COEF accordingly, and then DLEN_INT1 is set to the current value of DLEN_INT and AP_COEF1 is set to the current value of AP_COEF. Similarly, when Reader2 is updated, that means that the current value of DLEN is read or generated by the parameter generator 152, which then updates the values of DLEN_INT and AP_COEF accordingly, and then DLEN_INT2 is set to the current value of DLEN_INT and AP_COEF2 is set to the current value of AP_COEF.

When a new Reader update is made, before the next output audio sample is computed by the crossfader 166, the crossfade orientation must be updated appropriately. When Reader1 is being updated, $u_{NEW}(n)$ is defined as u2(n) and $u_{OLD}(n)$ is defined as u3(n). When Reader2 is being updated, $u_{NEW}(n)$ is defined as u3(n) and $u_{OLD}(n)$ is defined as u2(n). T0 is set to current sample index value, and the crossfader 166 then begins reading the CF_Table(n−T0) values.

The overall effect of synchronizing the update of alternating Reader parameters with the crossfader is to crossfade gradually into the output of the newly updated Reader so as to make a smooth legato transition into the new delay line length.

When the reader position for an allpass filter is suddenly changed, as happens to one of the allpass filters whenever the timing controller 154 performs a crossfade orientation change, the internal state of the allpass filter is likely to be inconsistent with the new input data it is receiving. That is, the internal state of the allpass filter at the current time T is not the same as it would have been if the allpass filter had always been receiving data from the new reader position. Over the next several sample periods after the reader position change, the internal state of the allpass filter transitions to a state that is consistent with the data at the new reader position. This adjustment period is called the "transient time." The inventors have determined that when the allpass filter coefficient is kept between −0.236 and +0.236 (corresponding to MINIMUM_DLEN_FRAC=0.618), the transient time of the allpass filter state is only about five time samples. That is, about five time sample periods after a reader position change, the internal state of the associated allpass filter is very close to what it would have been had the allpass filter always been receiving data from the new reader position.

If the output signal generated by the allpass filter were to be used to drive an audio speaker during the transient time, the output signal would typically include a high frequency "click" sound. To avoid this, the crossfade ramp table used by the crossfader in the preferred embodiment is set so that during each allpass filter's transient time, the output of the crossfader is produced entirely, or almost entirely by the other allpass filter (i.e., the filter in the reader that was not the last to be updated). In other words, the values of CF_Table(n−T0) are zero or very close to zero for index values of n−T0 that are less than 5. Effectively, the last updated reader's allpass filter is given several sample periods to "warm up" before the crossfader begins to crossfade over to the output of that allpass filter.

The internal state of each allpass filter is not reset or otherwise modified when its read pointer and filter coefficient are updated. The "warm up" period allows start-up filter transients to die away sufficiently as to make a smooth crossfade into the new delay line length.

Figure 7:
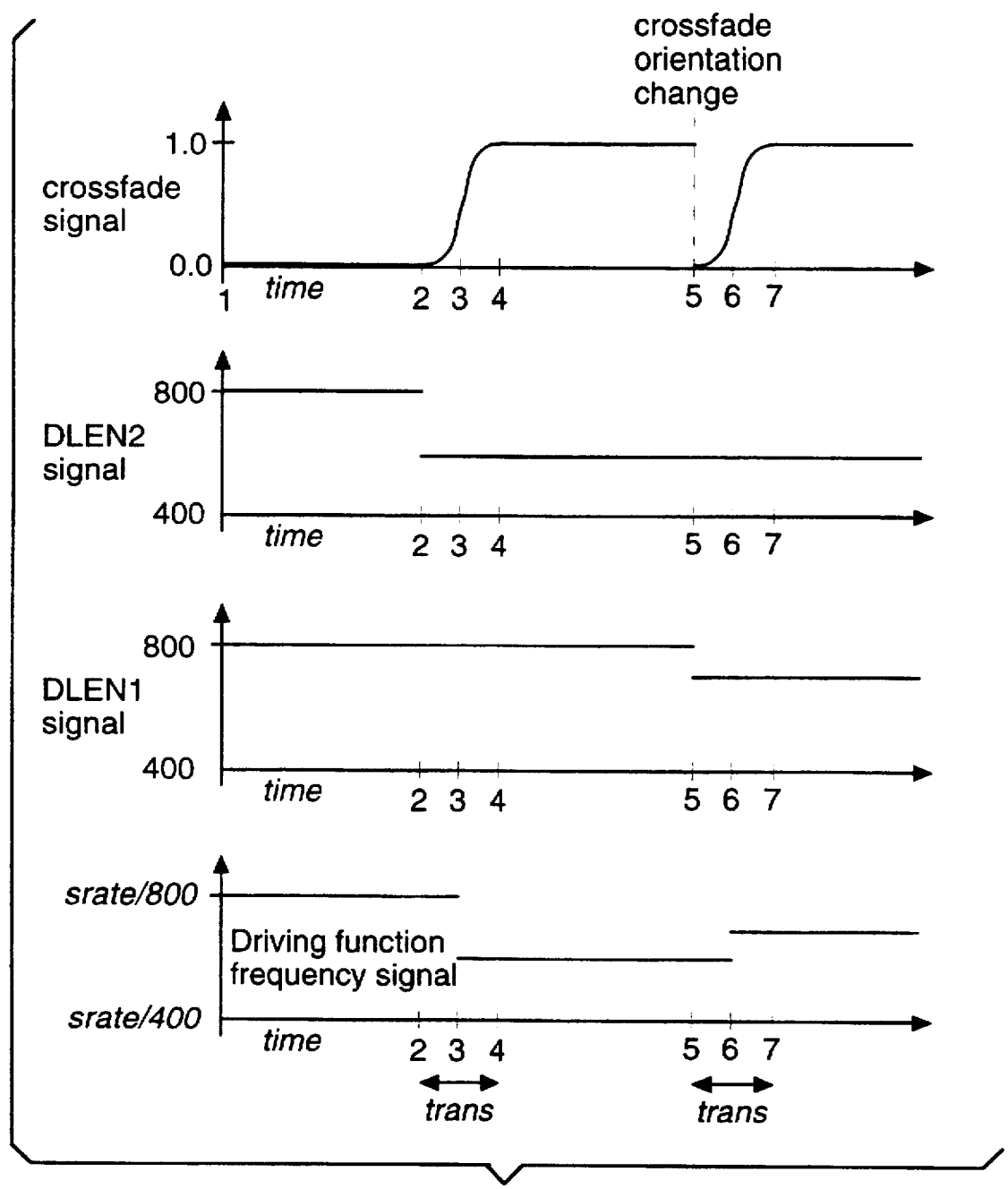
FIG. 7 is a timing diagram representing the operation of the crossfader in a preferred embodiment of the present invention.

A timing diagram of the crossfader's operation is shown in FIG. 7. This diagram corresponds to the generation of three notes, with two legato transitions. Time T1 corresponds to the start of the legato phrase. Reader1 is set to the delay length DLEN1 associated with the first note and the crossfader outputs the resulting u2(n) signal.

Time T2 is the beginning of the legato transition to the second node. Reader2 is set to the delay length DLEN2 associated with the second note and the crossfader begins crossfading from u2 to u3. Time T3 is the half-way point of the first legato transition, and the crossfade ramp value read from CF_Table is equal to 0.5. If the delay line resonator is simulating a driven oscillation, then the frequency of the driving function is preferably changed from a frequency corresponding to the first note to a frequency corresponding to the second note at time T3. Time T4 is the end of the first legato transition and the crossfade ramp value read from CF_Table(n−T0) has reached a value of 1.0. The output of the crossfader is equal to u3(n).

Time T5 marks the beginning of the second legato transition. Reader1 is set to the delay length DLEN1 associated with the third note, the crossfade orientation is changed, and the crossfader begins crossfading from u3 to u2. Time T6 is the half-way point of the second legato transition, at which point the crossfade ramp value read from CF_Table is equal to 0.5. If the delay line resonator is simulating a driven oscillation, the frequency of the driving function is preferably changed from a frequency corresponding to the second note to a frequency corresponding to the third note at time T6. Time T7 is the end of the second legato transition and the crossfade ramp value read from CF_Table(n−T5) has reached a value of 1.0. The output of the crossfader is equal to u2(n).

In an alternate embodiment, a synthesizer utilizing the present invention can be implemented using a single data processor, rather than the host data processor and DSP configuration shown in FIG. 4.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A sampled data, delay line structure, comprising:
    a sampled data delay line having a multiplicity of integer positions at which data is stored;
    two readers, each for reading data at a corresponding position of the delay line and generating a corresponding output;
    a crossfader that smoothly crossfades between the outputs of the two readers so as to generate an output signal that corresponds to a delay line position that transitions from a first delay line position to a second delay line position; the output signal produced by the crossfader representing a legato transition between a first musical note corresponding to the first delay line position and a second musical note corresponding to the second delay line position; and
    a controller that assigns to each reader a respective delay line position and that controls when the delay line position read by each reader is updated and also controls when the crossfader begins crossfading from the output of one of said readers to the other of said readers.

2. The sampled data, delay line structure of claim 1, wherein
    during synthesis of a legato phrase, said controller alternately updates a first one of said reader's delay line read position and a second one of said reader's delay line read position to synthesize successive notes in said legato phrase.

3. The sampled data, delay line structure of claim 1,
    each said reader including an interpolation filter for generating a signal representing data delayed by fraction of a sampling period with respect to data read from said delay line at the delay line read position associated with said each reader;
    said controller generating a read pointer and a filter coefficient for each of said readers, each reader's read pointer and filter coefficient being generated so as to correspond to a specified note.

4. The sampled data, delay line structure of claim 3, wherein
    each said read pointer, when updated by said controller, corresponds to an integer portion of a delay length value received from an external source, and each said filter coefficient, when updated by said controller, corresponds to a fractional portion of said delay length value received from said external source.

5. The sampled data, delay line structure of claim 3,
    said interpolation filter in each said reader is an allpass filter.

6. The sampled data, delay line structure of claim 1,
    said crossfader crossfades between the outputs of the two readers over a transition time of about 10 to 30 milliseconds.

7. The sampled data, delay line structure of claim 1, wherein the crossfader crossfades between the outputs of the two readers in accordance with a non-linear "s-shaped" ramp function.

8. A method of generating a legato transition between synthesized notes in a digital music synthesis system, comprising the steps of:

storing digitized data in a sampled data delay line having a multiplicity of integer positions at which data is stored;

reading data from said delay line at first and second positions of the delay line to generate two distinct musical note signals; and smoothly crossfading between the two distinct musical note signals so as to generate a legato transition therebetween, including generating an output signal that corresponds to a delay line position that transitions from the first delay line position to the second delay line position; the output signal produced by the crossfading step representing a legato transition between the first and second musical note signals.

9. The method of claim 8, said data reading step including utilizing first and second read pointers to determine where to read data from the delay line;

during synthesis of a legato phrase, alternately updating said first and second read pointers to synthesize successive musical notes in said legato phrase.

10. The method of claim 9, said data reading step including filtering said data read from said delay line so as to generate musical note signals representing data delayed by fraction of a sampling period with respect to data read from said delay line at positions associated with said first and second read positions.

11. The method of claim 10, said method including generating control signals for assigning delay line positions to said first and second read pointers and for generating filter coefficients for controlling the filtering of said data read from said delay line at positions associated with said first and second read positions.

12. The method of claim 8, wherein said crossfading step crossfades between the two distinct output note signals over a transition time of about 10 to 30 milliseconds.

13. The method of claim 8, wherein the crossfading step crossfades between the between the two distinct musical note signals in accordance with a non-linear "s-shaped" ramp function.

14. A signal processing system, comprising:

a data processor; and memory coupled to said data processor for storing data structures and instructions to be executed by said data processor;

said data structures stored in said memory including a sampled data delay line having a multiplicity of integer positions at which data is stored;

said instructions stored in said memory including:

data reading instructions for reading data at a first and second read positions of the delay line associated with first and second read pointers to generate first and second musical note signals;

crossfade instructions that generate an output signal that smoothly crossfades between the first and second musical note signals so as to generate a legato transition therebetween; and control instructions that control when the first and second read pointers are each updated and when said crossfade instructions are executed.

15. The signal processing system of claim 14, wherein said first and second read positions each include an integer component and a fractional component;

said data reading instructions including instructions for filtering said data read from said delay line so that said first and second musical note signals represent data delayed by first and second fractions of a sampling period with respect to data read from said delay line at positions associated with said integer components of said first and second read positions, respectively; said first and second sampling period fractions corresponding to said fractional components of said first and second read positions.

16. The signal processing system of claim 15, said control instructions including instructions for generating control signals for assigning delay line positions to said first and second read pointers and for generating filter coefficients for controlling the filtering of said data read from said delay line at positions associated with said integer components of said first and second read positions.

17. The signal processing system of claim 14, wherein said crossfade instructions crossfade between the first and second output signals over a transition time of about 10 to 30 milliseconds.

18. The signal processing system of claim 14, wherein the crossfade instructions generate the output signal that smoothly crossfades between the first and second musical note signals in accordance with a non-linear "s-shaped" ramp function.

* * * * *